C. C. F. NIESCHANG.
AUTOMOBILE BUMPER.
APPLICATION FILED NOV. 25, 1921.

1,410,343.

Patented Mar. 21, 1922.

Inventor
Charles C. F. Nieschang
By W. G. Burns, Attorney

UNITED STATES PATENT OFFICE.

CHARLES C. F. NIESCHANG, OF FORT WAYNE, INDIANA.

AUTOMOBILE BUMPER.

1,410,343.  Specification of Letters Patent.  Patented Mar. 21, 1922.

Application filed November 25, 1921. Serial No. 517,600.

*To all whom it may concern:*

Be it known that I, CHARLES C. F. NIESCHANG, a citizen of the United States of America, and resident of Fort Wayne, in the county of Allen and State of Indiana, have invented certain new and useful Improvements in Automobile Bumpers, of which the following is a specification.

This invention relates to improvements in automobile bumpers and the object thereof is to afford a bumper adapted to function in the usual manner and which will have in connection therewith adjustable impact members that may be elevated above the bumper proper so as to prevent encroachment of overhanging parts of other vehicles. It frequently occurs that when automobiles are parked along the curbing of a street, damages are sustained because one car, having an overhanging body, is backed into another car, during the attempt of the driver to extricate his car from between two other cars which are parked too closely together. In such cases, when a bumper of ordinary construction is used, the overhanging body of the backing vehicle is unobstructed by the bumper and crashes into the front of the machine causing damage to the more or less fragile parts. To prevent damages from accidents of this character is included as an object of the present invention.

These objects are accomplished by the construction illustrated in the accompanying drawings in which:—

Figure 1:
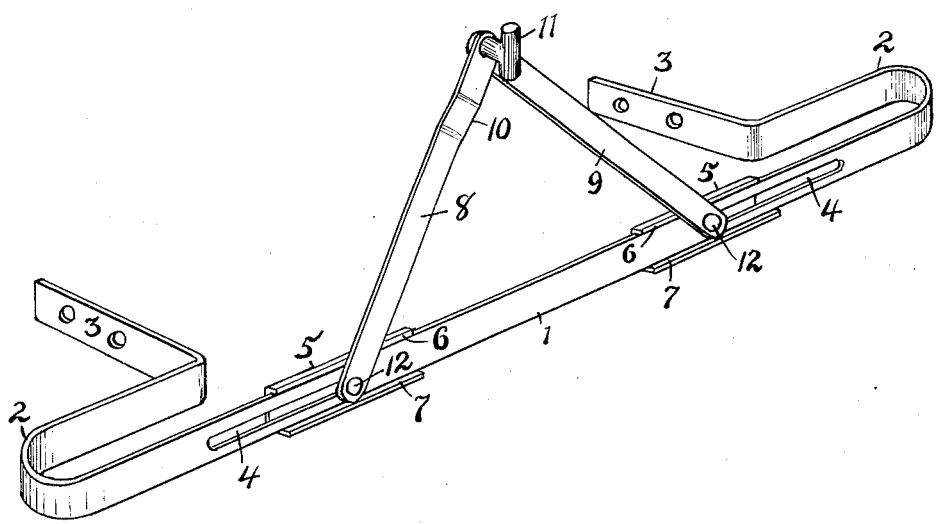
Figure 2:
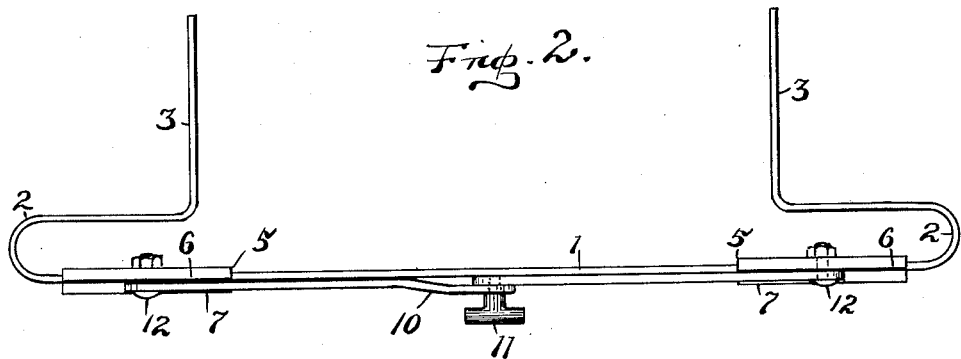

Fig. 1 is a perspective view of the bumper embodying the present invention and showing the auxiliary impact members in operating position; and Fig. 2 is a plan view of the bumper showing the auxiliary impact members in folded positions.

The characters appearing in the description refer to parts shown in the drawings and designated thereon by corresponding characters.

The invention comprises a bumper proper formed of a bar 1 having oppositely extending loops 2 and rearwardly extending terminals 3 by which the bumper proper is secured to the automobile. In the forward portion of the bumper proper are two horizontal slots 4 and on the bar 1 adjacent each slot is positioned a sliding bracket 5, the upper edge of which has a ledge 6 that rests upon the upper edge of the bar 1, and the lower part of the bracket has a ledge 7 that extends under the bar 1 and projects forwardly beyond the front face of the bar. Each bracket has secured thereto a folding impact member consisting of a bar 8 and 9 respectively, the bar 8 having an offset 10 made therein and arranged so as to overlap the bar 9 when the ends thereof are secured together by the thumb-screw 11 which is provided therefor. The opposite end of each bar is pivotally secured by means of a bolt 12 to the corresponding bracket 5, the bolt extending through the slot 4 in which it has sliding movement.

In utilizing the invention the meeting ends of the impact members 8 and 9 are elevated to the position shown in Fig. 1 and held adjustably in place by tightening the thumb-screw. While thus positioned the impact members afford added protection for the front of the automobile especially those parts extending above the bumper proper. When so desired the impact members may be folded down into the plane of the bumper proper by loosening the thumb-screw and moving the impact members down so that they rest upon the lower ledge 7 of their brackets upon which they are sustained in horizontal position. In moving the impact members to their folded position the brackets slide accommodatingly upon the bar 1 to the position shown in Fig. 2. When the members are thus positioned the front of the machine is accessible for cranking and other customary purposes.

What I claim is:—

1. In an automobile bumper, a bumper proper comprising a bar formed with oppositely disposed loops and extending extremities adapted for attachment to the frame of the automobile and having two longitudinal slots in its forward portion; two sliding brackets on the forward portion of the bar; and a pair of impact members having pivotal connection respectively with the corresponding brackets and being secured together at their opposite ends.

2. In an automobile bumper, a bumper bar adapted to be attached to the frame of the automobile; a pair of sliding members on the bar; a folding impact member in pivotal connection with each sliding member; and means securing the impact members together at their ends opposite the sliding members.

3. In a bumper for automobiles, a bumper bar adapted to be supported in connection with the frame of an automobile; and a pair of impact members secured together at one end thereof and each having sliding supported relation at their opposite ends with the bumper bar.

4. In a bumper for automobiles, a bumper bar adapted to be secured to the frame of an automobile; a pair of sliding members arranged upon the bar, each having a projecting shelf; an auxiliary impact member in pivotal connection with each sliding member; and means for securing the impact members together and in adjusted positions, said shelves being adapted to support the respective impact members when adjusted to their lowermost position.

5. In an automobile bumper, a bar forming a bumper proper; and a pair of auxiliary impact members having pivotal connection with each other and sliding supported relation with the bumper bar respectively at correspondingly opposite lateral points thereon, said impact members being adapted to be adjustably positioned so as to project above the bar proper.

CHARLES C. F. NIESCHANG.

Witnesses:
 MATILDA METTLER,
 WALTER G. BURNS.